(12) United States Patent
Young

(10) Patent No.: US 9,049,963 B2
(45) Date of Patent: Jun. 9, 2015

(54) APPARATUS FOR TREATING FOOD SUBSTANCES

(76) Inventor: Keith Young, Wantagh, NY (US)

( * ) Notice: Subject to any disclaimer, the term of this patent is extended or adjusted under 35 U.S.C. 154(b) by 0 days.

(21) Appl. No.: 13/596,429

(22) Filed: Aug. 28, 2012

(65) Prior Publication Data

US 2012/0319339 A1   Dec. 20, 2012

Related U.S. Application Data

(63) Continuation of application No. 12/490,888, filed on Jun. 24, 2009, now Pat. No. 8,251,357.

(60) Provisional application No. 61/075,167, filed on Jun. 24, 2008.

(51) Int. Cl.
 *B08B 5/04* (2006.01)
 *A47J 47/00* (2006.01)

(52) U.S. Cl.
 CPC .................... *A47J 47/005* (2013.01)

(58) Field of Classification Search
 CPC .......... A47J 47/005; B26D 7/20; B26D 7/225
 USPC .......................................... 269/289 R, 302.1
 See application file for complete search history.

(56) References Cited

U.S. PATENT DOCUMENTS

| | | | |
|---|---|---|---|
| 4,907,789 A * | 3/1990 | Tice ................................. 269/13 |
| 5,031,975 A | 7/1991 | Anderson | |
| 5,044,059 A | 9/1991 | DeGiulio | |
| 5,121,909 A * | 6/1992 | Stickel, III ................. 269/289 R |
| 5,312,178 A * | 5/1994 | King ........................... 312/140.4 |
| 5,520,324 A | 5/1996 | Cai | |
| 5,673,905 A | 10/1997 | Kiene | |
| 5,832,804 A | 11/1998 | Dudley et al. | |
| 5,865,105 A * | 2/1999 | Pepelanov ...................... 99/446 |
| 5,938,185 A * | 8/1999 | Kletter ...................... 269/289 R |
| 5,984,294 A * | 11/1999 | Bogomolny .............. 269/289 R |
| 5,992,035 A | 11/1999 | Otsu | |
| 5,996,983 A * | 12/1999 | Laurenzi .......................... 269/15 |
| 6,026,972 A | 2/2000 | Makowski | |
| 6,341,770 B1 * | 1/2002 | Landherr .................. 269/289 R |
| 6,460,841 B1 | 10/2002 | Durr | |
| 6,726,050 B1 | 4/2004 | Barentine et al. | |
| 6,745,702 B2 | 6/2004 | Goldberg et al. | |
| 6,866,035 B2 | 3/2005 | Haemerle | |
| 6,994,335 B2 | 2/2006 | Porchia et al. | |
| 7,178,798 B1 | 2/2007 | Funk et al. | |
| 7,191,712 B2 | 3/2007 | Goldberg et al. | |
| 7,208,216 B2 | 4/2007 | Ackerman et al. | |
| 7,213,806 B2 | 5/2007 | Mitchell | |
| 7,252,255 B2 * | 8/2007 | Cornfield ...................... 241/274 |
| 7,942,395 B2 | 5/2011 | Okada | |
| 8,251,357 B2 * | 8/2012 | Young ............................. 269/15 |
| 2002/0185801 A1 | 12/2002 | Cautereels et al. | |

(Continued)

*Primary Examiner* — Lee D Wilson
(74) *Attorney, Agent, or Firm* — Carter, DeLuca, Farrell & Schmidt, LLP

(57) ABSTRACT

An apparatus for treating food substances includes a cutting plate defining a longitudinal axis and having at least one cutting surface for supporting food substances and a collecting tray releasably mountable to the cutting plate. The collecting tray defines a reservoir for collecting food substances cut on the cutting surface. The collecting tray may define a spout adapted to facilitate pouring of liquid material of the food substances. The collecting tray may define first and second spout segments. The first and second spouts may be disposed in diametrical opposed relation.

14 Claims, 5 Drawing Sheets

(56) References Cited

U.S. PATENT DOCUMENTS

| | | |
|---|---|---|
| 2004/0119220 A1* | 6/2004 | Davis ................ 269/289 R |
| 2005/0040580 A1* | 2/2005 | Davis ................ 269/289 R |
| 2008/0084019 A1 | 4/2008 | Casale et al. |
| 2008/0134945 A1 | 6/2008 | Willey |
| 2008/0149552 A1 | 6/2008 | Murphy |
| 2008/0179803 A1 | 7/2008 | Shew et al. |
| 2008/0179805 A1 | 7/2008 | Shew et al. |
| 2009/0322004 A1* | 12/2009 | Young ................ 269/15 |
| 2011/0221112 A1 | 9/2011 | Kent |
| 2012/0319339 A1* | 12/2012 | Young ................ 269/15 |

* cited by examiner

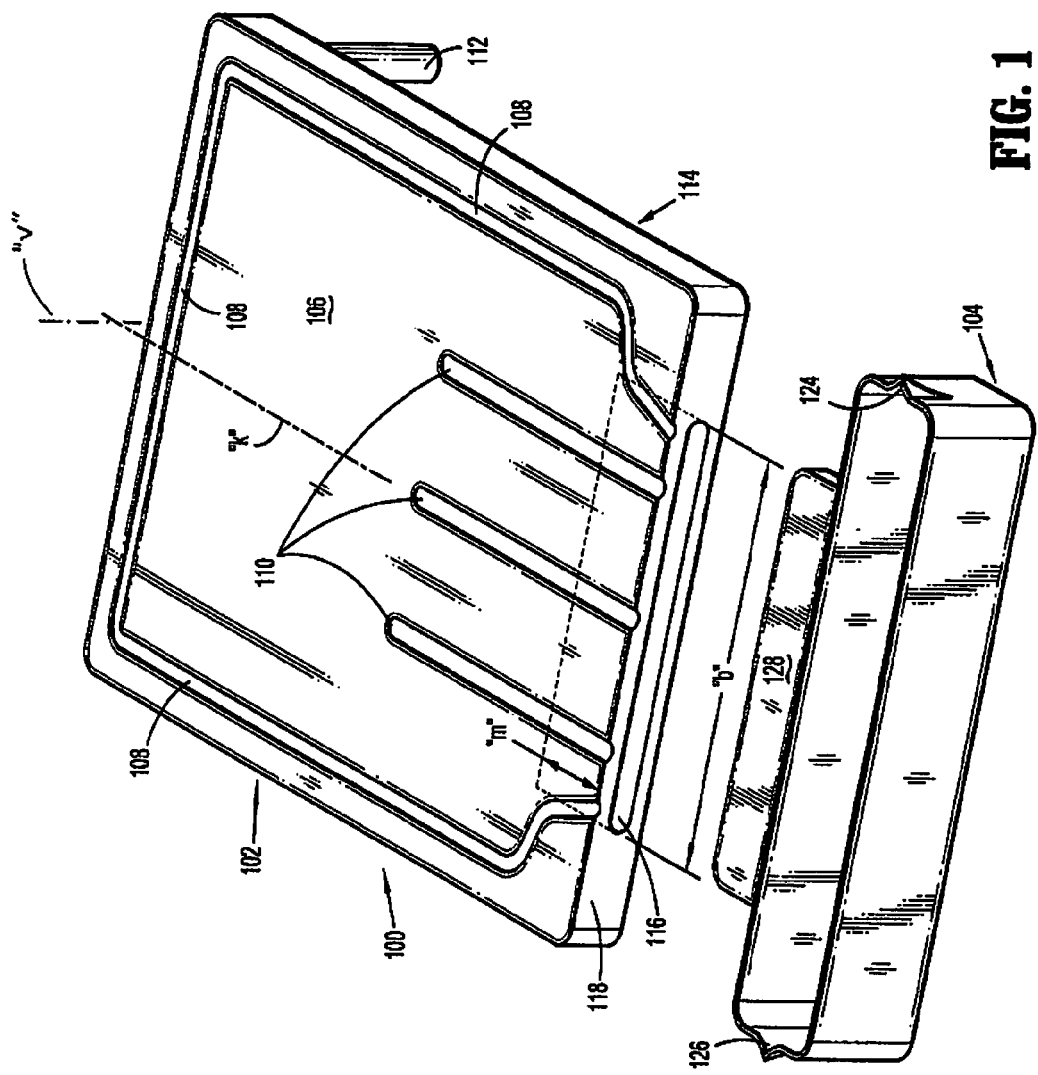
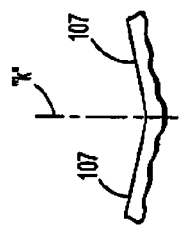

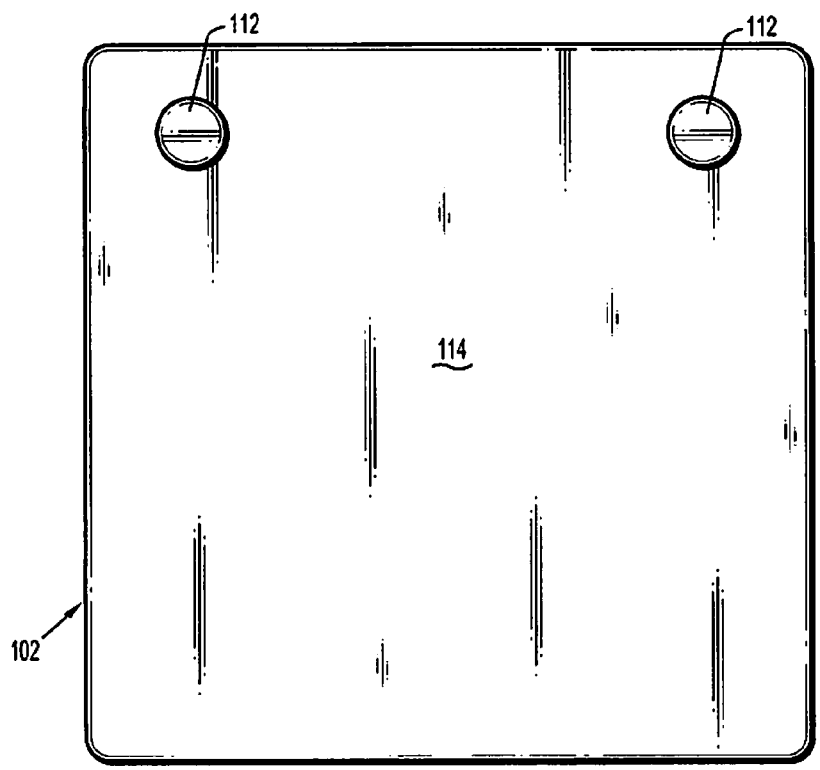
FIG. 3
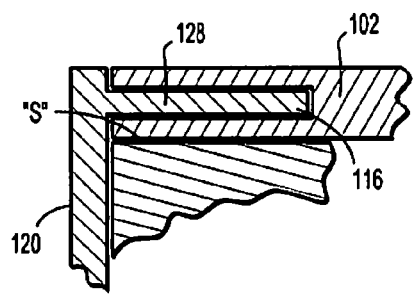 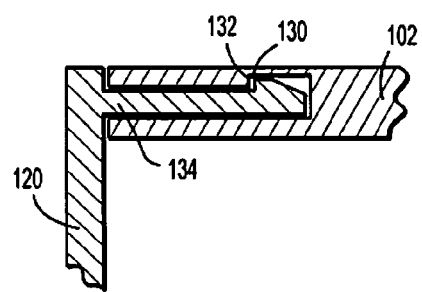
FIG. 5A       FIG. 5B

US 9,049,963 B2

APPARATUS FOR TREATING FOOD SUBSTANCES

BACKGROUND

This application is a continuation of application Ser. No. 12/490,888, filed on Jun. 24, 2009, issued as U.S. Pat. No. 8,251,357 to Young, which claims priority to, and the benefit of, U.S. Provisional Application Ser. No. 61/075,167, filed on Jun. 24, 2008 to Young, the entire contents of which are being incorporated by reference herein.

BRIEF DESCRIPTION

1. Technical Field

The present disclosure relates to an apparatus for treating food particles, and, in particular, relates to a cutting board apparatus incorporating features for facilitating removal of the food particles from the cutting board area and subsequent capturing for disposal.

2. Description of Related Art

Cutting boards are known in the art, and, typically, incorporate a cutting surface which may be planar or incorporate indentations to collect fluid released during the cutting process such as the juices released during the cutting of meat.

SUMMARY

Accordingly, the present disclosure relates to an apparatus for treating food substances. The apparatus includes a cutting plate defining a longitudinal axis and having at least one cutting surface for supporting food substances, and a collecting tray releasably mountable to the cutting plate. The collecting tray defines a reservoir for collecting food substances treated or cut on the cutting surface. The collecting tray may define a spout adapted to facilitate pouring of liquid or fluid material emanating from the food substances. The collecting tray may define first and second spouts. The first and second spouts may be disposed in diametrical opposed relation.

The cutting plate may include a peripheral edge having a grooved segment and the collecting tray may include a mounting lip or tab. The mounting lip may be received within the grooved segment in secured relation therewith to releasably secure the collecting tray to the cutting plate. The mounting lip and the grooved segment may be correspondingly dimensioned to establish a substantial frictional relation. In embodiments, the mounting lip and the grooved segment may include a locking pawl and detent mechanism to secure the two components.

The at least one cutting surface may include a fluid capturing groove arranged for collecting fluids and directing the fluids toward the collecting tray. The at least one cutting surface further may include an auxiliary fluid capturing groove disposed within an interior section of the cutting plate for collecting fluids and directing the fluids toward the collecting tray.

The cutting plate may define a second cutting surface opposing the first mentioned cutting surface. The second cutting surface may be substantially planar.

The at least one cutting surface may define sloped segments generally tapering toward the longitudinal axis. The cutting plate may include at least two legs depending therefrom to elevate one end of the cutting plate.

A roll of disposal bags may be mounted to the collecting tray. The roll may be adapted for rotation about an axis of rotation to dispense a disposal bag.

BRIEF DESCRIPTION OF THE PREFERRED EMBODIMENTS

The accompanying drawings, which are incorporated in and constitute a part of this specification, illustrate embodiments of the present disclosure and, together with the detailed description of the embodiments given below, serve to explain the principles of the disclosure.

FIG. 1 is a perspective view of the apparatus for treating food substances in accordance with the principles of the present disclosure illustrating the cutting plate and collecting tray in a disassembled condition;

FIG. 1A is a sectional view illustrating an alternate embodiment of the cutting plate;

FIG. 3 is a bottom plan view of the cutting plate illustrating the second side of the cutting plate;

FIG. 5A is an enlarged isolated view illustrating one mechanism for securing the collecting tray relative to the cutting plate;

FIG. 5B is an enlarged isolated view illustrating another mechanism for releasably securing the collective tray relative to the cutting plate.

DETAILED DESCRIPTION OF THE PREFERRED EMBODIMENTS

The cutting board apparatus of the present disclosure includes a cutting plate or member and a food particle catch or tray for accumulating vegetable and meat scraps, freshly diced food products, or juices from carved meats and the like.

Figure 2:
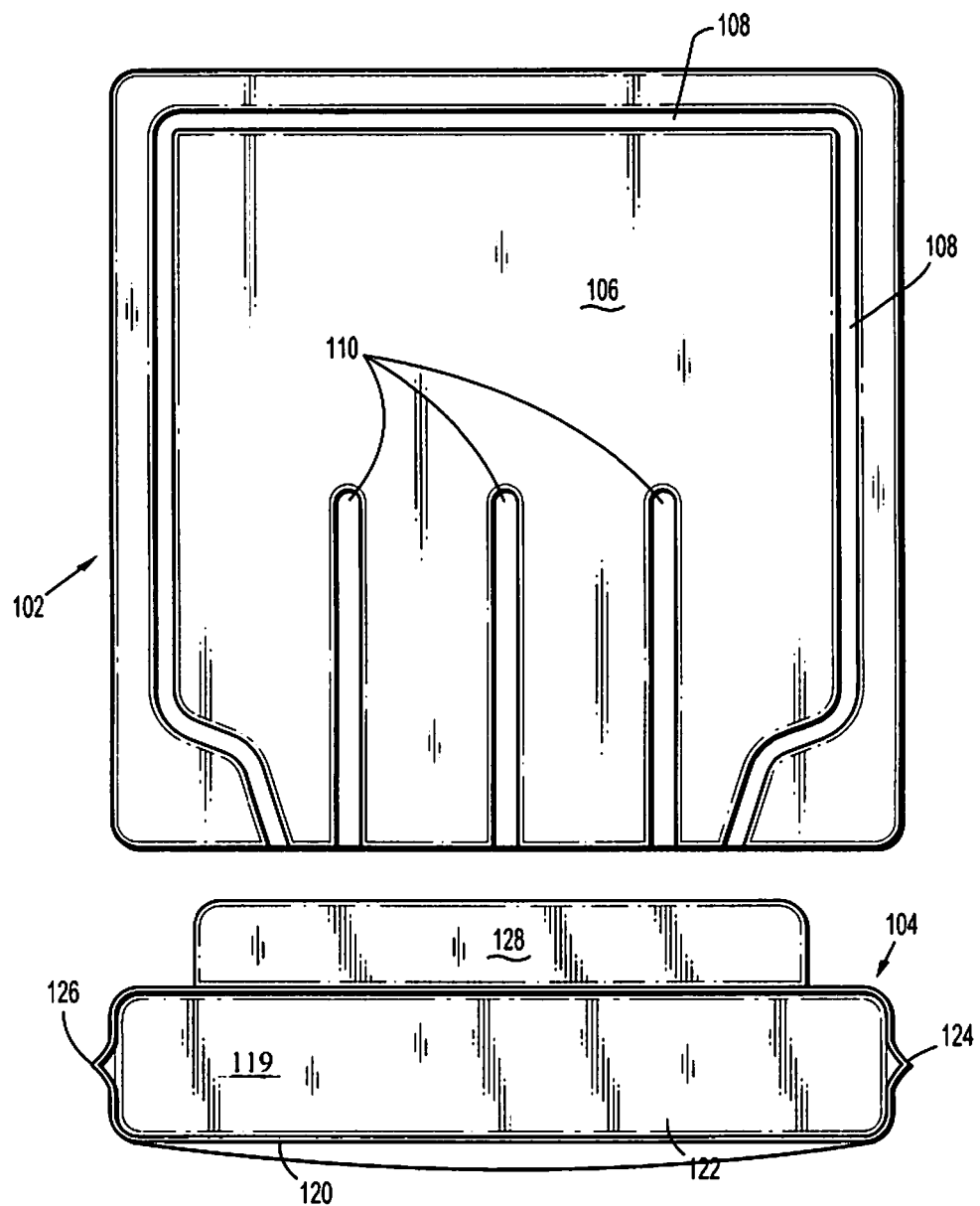
FIG. 2 is a top plan view of the apparatus of FIG. 1 further illustrating the cutting plate and the collecting tray in a disassembled condition.

With initial reference to FIGS. 1-2, the cutting board apparatus of the present disclosure is illustrated. Cutting board apparatus 100 includes cutting plate or board 102 defining longitudinal axis "k" and vertical axis "v", and particle collecting tray 104 which is releasably mounted to the plate 102. Cutting plate 102 includes first cutting surface 106 which may be particularly adapted for cutting meats or other food substances capable of producing a liquid or fluid when severed or cut. First cutting surface 106 may be substantially planar and may include a small, e.g., fluid capturing recess or routing 108 (e.g., ⅛ inch in width) around at least a section of the perimeter. In the alternative, first cutting surface may include surface segments 107 tapering inwardly relative to longitudinal axis "k" as depicted in FIG. 1A. Fluid capturing recess or routing 108 may be disposed adjacent three edges of the perimeter of cutting plate 102 to encapsulate and capture the released fluid and direct the fluid to collecting tray 104 thereby preventing seepage of the fluid beyond the perimeter of the cutting plate 102. Additional centrally or internally located fluid capturing recesses 110 may be provided to capture fluids adjacent the center area of first cutting surface 106 and direct the captured fluids into collecting tray 104. At least two feet 112 may be positioned in two corners on the underside or second surface side 114 of cutting plate 102 to orient first cutting surface 106 at a predefined angle relative to the support surface upon which the cutting apparatus 100 is positioned. This angular relationship will further facilitate drainage of the fluids toward collecting tray 104. Thus, the aforementioned features minimize the potential of the fluids migrating beyond cutting plate 104 and seeping along the support surface, down the front of cabinets or onto the floor etc, and will assist in directing the fluids to collecting tray 104 for subsequent use as a gravy for sliced meat, or for depositing in a pot to be used as an au jus or gravy thickener.

Cutting plate 102 further includes mounting groove 116 defined within one peripheral edge 118 of the cutting plate, e.g., adjacent collecting tray 104. Mounting groove 116 assists in releasably securing collecting tray 104 relative to cutting plate 102 as will be discussed hereinbelow. Mounting groove 116 extends within cutting plate 102 for a predetermined longitudinal distance "m" and along peripheral edge for a transverse length "b". Transverse length "b" may be the same or less than the transverse length of peripheral edge 118.

Referring now to FIG. 3, in conjunction with FIGS. 1-2, second side or cutting surface 114 of cutting plate 102 is depicted. Second cutting surface 114 may be substantially planar. Second cutting surface 114 may be adapted to support vegetables or other non-fluid producing items and provides a greater working surface than first cutting surface due to the absence of any fluid capturing recesses. Second cutting surface 114 is depicted with two feet 112 to orient first cutting surface 106 at a defined angle relative to the support surface or table as previously discussed. In the alternative, second cutting surface 114 may be devoid of feet 112.

Referring again to FIGS. 1-2, collecting tray 104 will be discussed. Collecting tray 104 is generally elongated in shape and has a base 119 and an outer wall or boundary 120 defining internal chamber 122 for collection of fluids, gravy, juices, etc. produced during cutting Collecting tray 104 may have a variety of dimensions including, but, not limited, to those outlined herein. Collecting tray 104 defines at least one spout 124 adjacent one end of the collecting tray 104. Spout 124 is dimensioned to pour the captured fluid into, e.g., a pot or cup. First and second spouts 124, 126 may be provided on respective opposed ends of collecting tray 104. First and second spouts 124, 126 provide increased flexibility to the user to distribute the fluid during, e.g., the cooking process. Collecting tray 104 may extend the transverse length of the cutting plate 102, or may be longer in length.

Collecting tray 104 includes mounting lip or segment 128 depending outwardly from outer wall 120 adjacent the upper area of the collecting tray 104. Mounting lip 128 is dimensioned to be cooperatively received within mounting groove 116 of cutting plate 102 to releasably mount the collecting tray 104 to the cutting plate 102.

Figure 4:
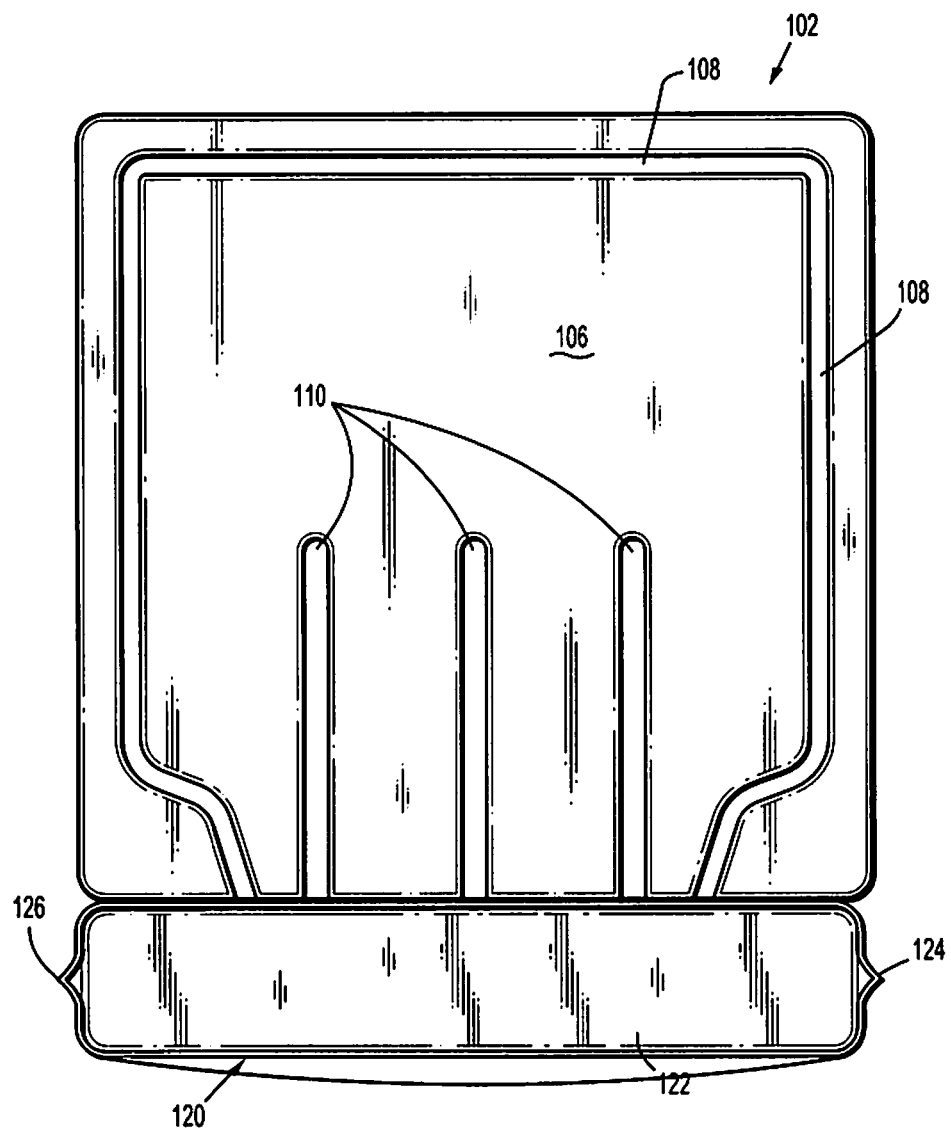
FIG. 4 is a top plan view illustrating the cutting plate and the collecting tray in an assembled condition.

Referring now FIG. 4, collecting tray 104 is depicted in the assembled or mounted condition relative to cutting plate 102. Various means for releasably mounting these components are envisioned. In one embodiment depicted in FIG. 5A, mounting lip 128 of collecting tray 104 and mounting groove 116 of cutting plate 102 are correspondingly dimensioned to establish an interference or frictional fit between the components to releasably secure the collecting tray to cutting plate 102. Mounting lip 128 and mounting groove 116 each define corresponding longitudinal lengths relative to longitudinal axis "k" to ensure that collecting tray 104 will not be inadvertently released from cutting plate 102 during use. In addition, or, in the alternative, as depicted in FIG. 4B, mounting lip 128 may include locking pawl 130 which cooperatively engages locking detent or shelf 132 adjacent mounting groove 116 to releasably secure the components. Locking pawl 130 may rotate about living hinge 134 during insertion and removal of mounting lip 128 within mounting groove 116 to effect corresponding engagement and release of the locking pawl 130 relative to locking detent 132. As a further alternative, the mounting lip 128 may be positioned beneath the cutting plate 102 and held down in place by the weight of the cutting plate 102.

Collecting tray 104 is preferably mounted relative to cutting plate 102 in a manner where the upper surface of collecting tray 104 is flush or below the operative cutting surface 106, 114 of cutting plate 102. This will ensure that fluids removed, e.g., by fluid capturing grooves are directed into internal chamber 122 of collecting tray and/or the sliced particles or scrap may be swept into the collecting tray. In addition, collecting tray 104 may be positioned with respect to support surface "s" in a manner where the collecting tray 104 is not supported by the support surface "s", but is supported by the releasable mounting mechanisms discussed hereinabove. (FIG. 5A)

During use, collecting tray 104 and cutting plate 102 are assembled with the desired cutting surface 106, 114 facing upward. Apparatus 100 may be manipulated such that collecting tray 104 hangs off the edge of the support surface or counter, i.e., only supported by the cooperative engagement of mounting tab 128 of the collecting tray 104 and mounting groove 120 of cutting plate 102. Foods substances are severed or cut on the cutting surface 106, 114 with the fluid and/or severed scraps or cut food particles being directed by the user or into fluid capturing recesses 108, 110 into the collecting tray 104. Collecting tray 104 may be released from cutting plate 102. The fluids or food particles may be dispensed directly into the trash or back into a bowl or a pot without stopping to lift the scraps off of the cutting plate 102, or moving the cutting plate 102 to the stove.

Figure 6:
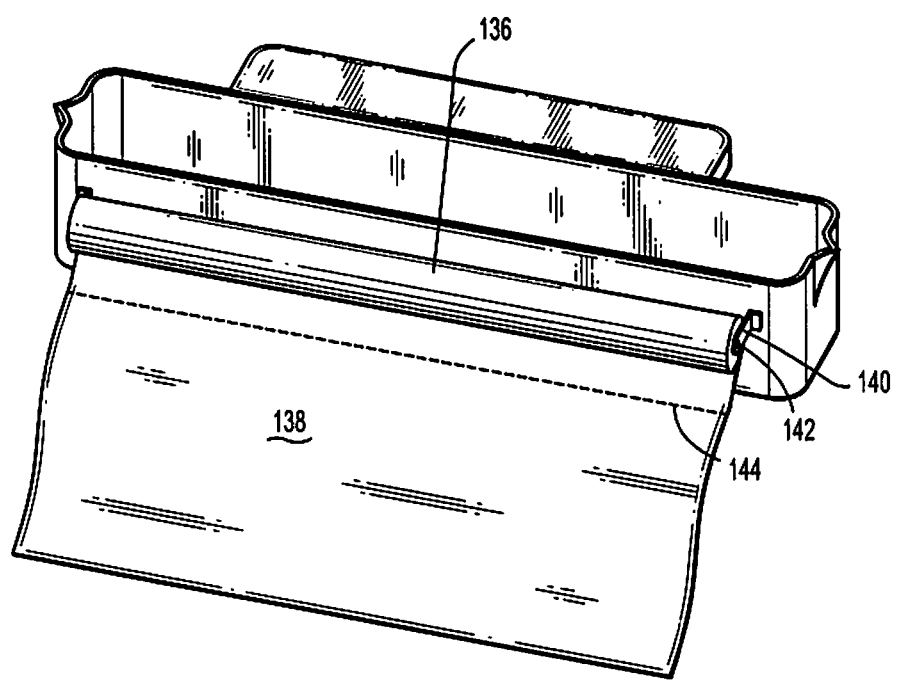
FIG. 6 is a perspective view of an alternate embodiment of the collecting tray incorporating a roll of disposal bag.

In another embodiment depicted in FIG. 6, collecting tray 104 may include a roll 136 of disposal bags 138 mounted via pin or hinge segments 140 depending from wall 122 of the collecting tray 102. Roll 136 may be adapted for rotational movement "t" about a pin 142 to permit dispensing of the individual bags 138. Roll 136 would incorporate a plurality of selectively detachable disposal bags 138 which may be individually separated along, e.g., adjacent score or perforated lines 144. Any means for mounting the roll 136 to the collecting tray 104 are envisioned. Disposal bag 138 may be positioned within internal chamber 122 of collecting tray 104 to catch the food components thereby obviating the necessity of cleaning the collecting tray 104 after use.

The cutting plate 102 and/or the collecting tray 104 may be made of any suitable material including Lexan™ or food grade plastic and produced in a variety of colors.

It will be understood that various modifications and changes in form and detail may be made to the embodiments of the present disclosure without departing from the spirit and scope of the disclosure. Therefore, the above description should not be construed as limiting the invention but merely as exemplifications of embodiments thereof. Those skilled in the art will envision other modifications within the scope and spirit of the present disclosure as defined by the claims appended hereto.

What is claimed is:

1. An apparatus for treating food substances, which comprises:
   a cutting plate defining a longitudinal axis and having a first cutting surface and a second cutting surface diametrically opposing the first cutting surface for supporting food substances, the cutting plate defining a peripheral edge extending between the first and second cutting surfaces; and
   a collecting tray releasably mountable to the peripheral edge of the cutting plate and depending outwardly from the peripheral edge, the collecting tray defining a reservoir for collecting food substances cut on the cutting surface, the collecting tray defining a spout segment adapted to facilitate pouring of liquid material of the food substances.

2. An apparatus for treating food substances, which comprises:
   a plate defining a longitudinal axis and a vertical axis, the plate including first and second food support sides in diametrical opposed relation along the vertical axis and a peripheral edge extending between the first and second support sides;
   a collecting tray defining an inlet opening leading to a reservoir for collecting food substances, the collecting tray being repositionable relative to the plate between a first orientation thereof with the first support side of the plate presented for supporting food substances and a second orientation with the second support side of the plate presented for supporting food substances the collecting tray including a base and an outer wall extending from the base, the base and the outer wall defining the reservoir; and
   one of the peripheral edge of the plate and the collecting tray includes a grooved segment and the other of the peripheral edge of the plate and the collecting tray includes a mounting lip, the mounting lip being received within the grooved segment in secured relation therewith to releasably secure the collecting tray to the plate in either the first and second orientations of the plate with the base of the collecting tray being vertically below the cutting plate in each of the first and second orientations.

3. The apparatus according to claim 2 wherein the peripheral edge of the plate has the mounting groove extending through the peripheral edge and between the first and second support surfaces of the plate, the mounting groove being the grooved segment.

4. The apparatus according to claim 3 wherein the collecting tray includes a mounting tab, the mounting tab receivable within the mounting groove of the plate to releasably secure the collecting tray to the plate, the mounting tab being the mounting lip.

5. The apparatus according to claim 4 wherein the mounting groove and the mounting lip are correspondingly dimensioned to establish a substantial frictional relation.

6. The apparatus according to claim 4 wherein the mounting groove and the mounting lip are correspondingly dimensioned to establish one of a snap fit relation or tongue and groove relation.

7. The apparatus according to claim 4 wherein the mounting groove and the mounting lip are in substantial parallel relation with the longitudinal axis of the plate when the collecting tray is secured to the plate in each of the first and second orientations thereof.

8. An apparatus for treating food substances, which comprises:
   a cutting plate defining a longitudinal axis and a vertical axis and having at least one cutting surface for supporting food substances, the cutting plate defining a peripheral edge; and
   a collecting tray releasably mounted to the peripheral edge of the cutting plate and depending outwardly from the peripheral edge, the collecting tray defining a reservoir for collecting food substances cut on the cutting surface, the collecting tray defining a spout segment adapted to facilitate pouring of liquid material of the food substances, the collecting tray defines first and second spout segments adjacent respective opposed ends of the collecting tray.

9. The apparatus according to claim 1 wherein the collecting tray includes a base and an outer wall extending from the base, the base and the outer wall defining the reservoir.

10. The apparatus according to claim 9 wherein at least the base of the collecting tray is vertically below the cutting plate when the collecting tray is mounted to the cutting plate.

11. The apparatus according to claim 10 wherein the first cutting surface includes at least one fluid capturing recess, the at least one fluid capturing recess extending substantially to the peripheral edge.

12. the apparatus according to claim 11 wherein the second cutting surface includes at least one foot segment to orient the first cutting surface at a predetermined angle to facilitate drainage of fluids toward the collecting tray.

13. An apparatus for treating food substances, which comprises:
   a cutting plate defining a longitudinal axis and a vertical axis and having at least one cutting surface for supporting food substances, the cutting plate defining a peripheral edge, the cutting plate includes a first cutting surface and a second cutting surface diametrically opposing the first cutting surface, the cutting plate includes a mounting groove extending with the peripheral edge and between the first and second cutting surfaces of the cutting plate; and
   a collecting tray releasably mounted to the peripheral edge of the cutting plate and depending outwardly from the peripheral edge, the collecting tray defining a reservoir for collecting food substances cut on the cutting surface, the collecting tray includes a base and an outer wall extending from the base, the base and the outer wall defining the reservoir, the collecting tray includes a mounting tab receivable within the mounting groove to releasably mount the collecting tray to the cutting plate.

14. The apparatus according to claim 13 wherein the mounting groove is dimensioned to extend along a major portion of the length of the peripheral edge.

* * * * *